United States Patent
Maeda et al.

Patent Number: 5,707,522
Date of Patent: Jan. 13, 1998

[54] PERMSELECTIVE MEMBRANE OF POLYACRYLONITRILE COPOLYMER AND PROCESS FOR PRODUCING THE SAME

[75] Inventors: Yasushi Maeda, Shizuoka; Kengo Magara, Hyogo; Hitoshi Tsugaya, Osaka, all of Japan

[73] Assignee: Daicel Chemical Industries, Ltd., Japan

[21] Appl. No.: 706,748

[22] Filed: Sep. 9, 1996

Related U.S. Application Data

[62] Division of Ser. No. 39,051, Apr. 5, 1993, Pat. No. 5,554,292.

[51] Int. Cl.$^6$ ............................................. B01D 33/21
[52] U.S. Cl. .......................... 210/500.23; 210/500.43; 210/490; 210/640; 96/4
[58] Field of Search .................... 210/500.43, 640, 210/651, 654, 490, 500.23, 500.21; 264/41, 45; 427/245, 246; 96/4

[56] References Cited

U.S. PATENT DOCUMENTS

| | | | |
|---|---|---|---|
| 4,025,439 | 5/1977 | Kamada et al. | 264/41 |
| 4,906,379 | 3/1990 | Hodgins et al. | 210/500.43 |
| 5,039,421 | 8/1991 | Linder et al. | 210/651 |
| 5,554,292 | 9/1996 | Maeda et al. | 210/640 |

*Primary Examiner*—Ana Fortuna
*Attorney, Agent, or Firm*—Weingram & Associates, P.C.

[57] ABSTRACT

A separatory membrane is provided which has a sufficient durability and shows a high rate of permeation therethrough and a high separation factor to a variety of organic substances and a wide range of concentration thereof in mutual separation of organic substances and separation of a water/organic substance mixture by pervaporation, vapor permeation or perstraction. The separatory membrane shows the performance that water permeates selectively through the membrane while satisfying such conditions that the product (QL) of the rate Q (kg/m$^2$·hr) of permeation and the thickness L (μm) of the membrane is at least 0.5 kg·μm/m$^2$·hr and that the separation factor $\alpha \geq 10$ and $\log\alpha \geq -1.77 \times \log(QL) + 2.77$ when the pervaporation performance of a 5–30 μm-thick dense uniform membrane is evaluated using as a liquid feed, an 80 wt. % aqueous solution of acetic acid at a temperature of 70° C., and comprises, as the membrane material, a polyacrylonitrile copolymer constituted of 90 to 97 mol % of acrylonitrile monomer units and a specific comonomer(s).

13 Claims, 1 Drawing Sheet

PERMSELECTIVE MEMBRANE OF POLYACRYLONITRILE COPOLYMER AND PROCESS FOR PRODUCING THE SAME

This application is a division of application Ser. No. 08/039,051, filed Apr. 5, 1993, which application is now U.S. Pat. No. 5,554,292.

FIELD OF INDUSTRIAL APPLICATION

The present invention relates to a permselective membrane of a polyacrylonitrile copolymer and a process for producing the same. More particularly, the present invention relates to a permselective membrane of a polyacrylonitrile copolymer useful for mutual separation of organic substances or separation of a water/organic substance mixture by pervaporation, vapor permeation or perstraction.

PRIOR ART

With respect to concentration and separation of an aqueous solution of an organic substance using a membrane, reverse osmosis has been put into practical use for concentration of some of low-concentration aqueous organic substance solutions. Since a pressure higher than the osmotic pressure of a separation liquid must be applied to a liquid to be subjected to separation in the case of reverse osmosis, however, reverse osmosis is inapplicable to high-concentration aqueous solutions of an organic substance, the osmotic pressures of which are naturally high. Thus, the concentration of separable solutions are limited in the case of reverse osmosis.

By contrast, pervaporation and vapor permeation have been stepping into the limelight as new separation methods free from the influence of osmotic pressure. In the case of pervaporation, the liquid to be subjected to separation is fed on the primary side of a membrane, while the pressure is decreased or a carrier gas is passed on the secondary side (the side of a permeated substance) of the membrane to permeate a substance to be separated in a state of a gas through the membrane. Vapor permeation is different from pervaporation in that a vapor of a mixture is fed on the primary side of a membrane. The substance permeated through the membrane can be recovered by cooling and condensing the permeated vapor.

Many research examples of pervaporation have been reported up to date. For example, U.S. Pat. Nos. 3,750,735 and 4,067,805 disclose examples of organic substance/water separation with a polymer having active anionic groups, and U.S. Pat. Nos. 2,953,502 and 3,035,060 disclose examples of ethanol/water separation with a cellulose acetate membrane and a polyvinyl alcohol membrane, respectively. In Japan as well, Japanese Patent Publication-A No. 109204/1984 discloses examples of use of a cellulose acetate membrane and a polyvinyl alcohol membrane, and Japanese Patent Publication-A No. 55305/1984 discloses an example of use of a crosslinked polyethyleneimine membrane. Further, Japanese Patent Publication-B Nos. 10548/1979, 10549/1979 and 49041/1984 disclose experimental examples of separation of a water/organic substance mixture by using a synthetic polymer membrane having ionic groups introduced thereinto. However, the separation performances of the membranes disclosed in these publications exhibit low rates of permeation in particular, thus leading to poor utilities of the membranes.

On the other hand, attempts to effect separation based on a difference in size between molecules capable of permeation by using a membrane having a small free volume have heretofore been made on the basis of a theory that permeation of a liquid or a vapor is governed by dissolution and diffusion (see J. Memb. Sci., 30. (1987)).

However, there is a defect that a membrane having a small free volume is low in the rate of permeation therethrough, though the separation factor thereof is large. Thus, attempts to utilize a difference in solubility between substances have heretofore been made to increase the rate of permeation and also the selectivity. For example, Japanese Patent Publication-A No. 24007/1981 discloses a permeable membrane of an aromatic polyamide-imide having sulfone groups introduced into the molecular chains thereof to thereby improve the rate of permeation of water. However, there is a defect that an increase in the amount of sulfone groups in the polymer correspondingly leads to poor membrane-forming properties, to a decrease in the mechanical strength of the membrane obtained, and a loss in selectivity based on molecular sizes due to swelling to result in a loss in the selectivity in separation of water and an organic substance from each other.

On the other hand, as examples of membranes excellent in separation performance, membranes made of anionic polysaccharides and derivatives of polysaccharides are disclosed in Japanese Patent Publication-A No. 129104/1985. These membranes, however, potentially involve such inevitable problems peculiar to natural polymers as depolymerization with an acid or an alkali and decomposition with bacteria, with the result that good durability, chemical resistance, etc., of the membranes cannot be expected. Further, as membranes excellent in both the rate of permeation and the separation factor, Japanese Patent Publication-A Nos. 182005/1988 and 11607/1989, in which membranes mainly made of a material having carboxyl groups are disclosed, are cited.

Most of these exemplifying membranes require a technology of formation of a thin membrane such as coating to increase the rate of permeation when they are put into practical use. However, difficulties in practical use of these membranes are encountered because of defects due to the presence of fine particles and other impurities and problems of cracking of the coating layer and the like.

DISCLOSURE OF THE INVENTION

Accordingly, an object of the present invention is to provide a separately membrane for mutual separation of organic substances or separation of a water/organic substance mixture through pervaporation, vapor permeation or perstraction, which exhibits a sufficient durability, a high rate of permeation and a high separation factor for a variety of organic substances and for a wide range of concentrations.

The present inventors have made extensive investigations with a view to attaining the above-mentioned object and, as a result, have completed the present invention.

Namely, the present invention provides a permseletive membrane of a polyacrylonitrile copolymer for mutual separation of organic substances or separation of a water/organic substance mixture which comprises at least one polyacrylonitrile copolymer constituted of 90 to 97 mol % of acrylonitrile monomer units and at least one comonomer unit selected from the group consisting of comonomers represented by the general formula (I):

$$R^1(R^2)C=C(R^3)R^4 \qquad (I)$$

(wherein $R^1$, $R^2$, $R^3$ and $R^4$ each represent a substituent selected from among a hydrogen atom, and alkyl groups, a hydroxyl group, a carboxyl group, acid anhydride groups, amide groups, imide groups, a sulfonic group, a phosphoric group, an amino group, a pyridyl group, a glycidyl group and organic groups containing derivatives thereof, except the case where all substituents are hydrogen atoms and the case where one susbtituent is a methyl group and the three substituents are hydrogen atoms), characterized in that the membrane comprises, as the membrane material, the copolymer exhibiting a performance that water permeates therethrough selectively while satisfying such conditions that the product (QL) of the rate Q (kg/m²·hr) of permeation and the thickness L (μm) of the membrane is at least 0.5 kg·μm/m²·hr, the separation factor $\alpha \geq 10$, and $\log\alpha \geq -1.77 \times \log(QL)+2.77$ when the pervaporation performance of a 5–30 μm-thick dense uniform membrane of the same kind as that described above is evaluated using, as a liquid feed, an 80 wt. % aqueous solution of acetic acid at a temperature of 70° C.

Further, the present invention provides a permselective membrane of the polyacrylonitrile copolymer of the kind as described above which is an asymmetric membrane having, as the outermost layer, a dense layer (skin layer) having a thickness of 0.05 to 5 μm and substantially free from pores having a pore size of at least 0.5 μm.

Furthermore, the present invention provides a process for producing an asymmetric membrane of the kind as described above, that is, a permselective membrane of a polyacrylonitrile copolymer in the form of a flat, tubular or hollow fiber asymmetric membrane having, as the outermost layer, a dense layer (skin layer) having a thickness of 0.05 to 5 μm and substantially fee from pores having a pore size of at least 0.5 μm, characterized by casting a solution for preparing a membrane, which is prepared by dissolving the copolymer described above in an aprotic polar organic solvent to prepare a solution having a copolymer concentration of 10 to 30 wt. % and, if necessary, adding thereto a third component, on a support or extruding the solution through a tube-in-orifice type nozzle, coagulating the cast or extruded solution in a coagulating bath by a wet or dry-and-wet process to form an asymmetric membrane, and subjecting the membrane to a wet post-treatment in water or steam at a temperature of at least 90° C. or subjecting the membrane to a dry post-treatment in a dry atmosphere at a temperature of the glass transition point (Tg) of the copolymer to 180° C. to adjust the rate $Q(N_2)$ of nitrogen gas permeation through the resulting membrane in the range of $5 \times 10^{-6}$ to $1 \times 10^{-3}$ cm³(STP)/cm²·sec·cmHg. Hereinabove STP represents a standard state of 0° C. and 1 atm (Standard Temperature Pressure).

In order to selectively permeate water through the membrane from a liquid mixture of water and an organic substance, an aqueous solution of an organic substance or a vapor mixture of water and an organic substance, it is preferable to introduce functional groups having a high affinity for water into the membrane. Therefore, the present inventors have attempted to introduce, by copolymerization, a monomer having a functional group having a high affinity for water into polyacrylonitrile as a solvent-resistant membrane material with a view to increasing the water permeability and organic substance separating ability of the membrane.

The method of preparing the polyacrylonitrile copolymer to be used in the present invention is not particularly restricted. An objective polyacrylonitrile copolymer can be readily obtained by polymerizing acrylonitrile monomer with a comonomer(s) represented by the aforementioned general formula (I), particularly a comonomer(s) having a functional group having a high affinity for water, in the presence of a polymerization initiator such as azobisisobutyronitrile according to a customary method.

The objective copolymer can also be obtained by copolymerization of acrylonitrile with vinyl acetate or the like and subsequent partial saponification to yield hydroxyl groups, or by partially converting the cyano groups of the acrylonitrile units into amide groups with sulfuric acid. Further, only the surface of the membrane can be modified by combination of such methods to obtain a membrane having an anisotropy in the thickness-wise direction of the membrane.

A comonomer(s) to be used in the present invention and represented by the aforementioned general formula (I) is selected from among those comonomers having an alkyl group, a hydroxyl group, a carboxyl group, an acid anhydride group, an amide group, an imide group, a sulfonic group, a phosphoric group, an amino group, a pyridyl group, a glycidyl group and a derivative group thereof except for ethylene and propylene, without any particular restriction. When the membrane is used to selectively permeate water therethrough from a mixture of water and an organic substance, use is preferably made of at least one member selected among polymerizable monomers having a hydroxyl group, a carboxyl group, an amide group, a sulfonic group, a pyridyl group, a glycidyl group or a derivative group thereof, and examples of which include acrylamide, vinyl acetate, acrylic acid, methacrylic acid, methyl acrylate, methyl methacrylate, vinylsulfonic acid, N-vinyl-2-pyrrolidone, N-vinylimidazole, N-vinylphthalimide, 2-acrylamido-2-methyl-1-propanesulfonic acid, styrenesulfonic acid, vinylsulfonamide, vinylsulfonanilide, vinylsulfonemethylanilide, vinylsulfonacetanilide, vinylbenzoic acid, vinylacetamide, maleic anhydride, glycidyl methacrylate, vinylpyridine and 2-N,N-diethylaminoethyl methacrylate.

Particularly polyacrylonitrile copolymers, wherein at least one kind of comonomers is a water-soluble monomer, at least one kind of comonomers is selected from the group consisting of N-vinyl-2-pyrrolidone, vinyl acetate, methyl acrylate, acrylic acid and acrylamide, its comonomer units have vinyl acetate monomer units and 2-N,N-diethylaminoethyl methacrylate monomer units in the ranges of 1 to 9.5 mol % and 0.5 to 9 mol %, respectively, and the like, are preferably used.

The copolymerization ratio of acrylonitrile units to comonomer units can be arbitrarily varied depending on an object component to be separated and the required separation performance. In order to increase the rate of permeation through the membrane and secure the solvent resistance and membrane forming properties thereof, the above-mentioned ratio is preferably such that the acrylonitrile monomer units are in the range of 90 to 97 mol % and the comonomer units represented by the general formula (I) are in the range of 3 to 10 mol %.

The performances of a pervaporation membrane and a vapor permeation membrane can generally be represented by the rate Q (kg/m²·hr) of permeation therethrough and the separation factor ($\alpha$) thereof.

The separation factor $\alpha$ is defined by the following formula:

$$\alpha = \frac{P_A/P_B}{f_A/f_B}$$

wherein $P_A$ and $P_B$ represent the concentrations (wt. %) of respective components A and B in a permeated vapor and $f_A$ and $f_B$ represents the concentrations (wt. %) of the respective components A and B in a feed, provided that the component A more preferentially permeates through a membrane than the component B.

In the practical use of a membrane, the larger these values, the superior the membrane in general. In practice, however, an 80 wt. % aqueous solution of acetic acid at a temperature of 70° C. is used as a model liquid to evaluate the performance of a dense uniform membrane having a thickness of 5 to 30 μm. As a result of evaluation, it is desirable that the product (QL) of the rate Q (kg/m²·hr) of permeation and the thickness L (μm) of the membrane is at least 0.5 kg·μm/m²·hr, while the separation factor $\alpha \geq 10$ and $\log\alpha \geq -1.77 \times \log(QL) + 2.77$.

Herein, the sphere represented by $\log\alpha \geq -1.77 \times \log(QL) + 2.77$ is an area on or above a straight line formed by connecting a point represented by QL=0.5 kg·μm/m²·hr and $\alpha$=2,000 with a point represented by QL=10 kg·μm/m₂·hr and $\alpha$=10 in the logarithmic-logarithmic graph of FIG. 1 showing a relationship between the separation factor $\alpha$ and QL.

The significance of this sphere is such that the use of, for example, a membrane material corresponding to a point in the left-upper area A in FIG. 1 will suffice when a membrane exhibiting a slightly low rate of permeation therethrough but capable of showing a high selectivity is necessary, while the use of, for example, a membrane material corresponding to a point in the right-lower area B in FIG. 1 will suffice when a membrane capable of exhibiting a high rate of permeation therethrough is necessary in contrast. Particularly in a hybrid type system wherein pervaporation or vapor permeation is combined with distillation and/or extraction as disclosed in Japanese Patent Publication-A No. 111404/1990, a high separation factor is unnecessary, while a membrane capable of exhibiting a high rate of permeation therethrough is rather required. In such a case, it is preferable to use a polyacrylonitrile copolymer falling within the area B.

Further, in the present invention, copolymers mutually different in copolymerization ratio may be blended together to control the separation performance of the resulting membrane.

In the present invention, an 80 wt. % aqueous solution of acetic acid at a temperature of 70° C. is used as a model liquid, to which the membrane of the present invention is of course not limited with respect to object liquid mixtures to be subjected to separation of components thereof.

The membrane of the present invention may be in the form of a flat membrane, a tubular membrane, a hollow fiber membrane or the like without any particular restriction, However, it is preferably an asymmetric membrane having, as the outermost layer, a dense layer (skin layer) having a thickness of 0.05 to 5 μm and substantially free from pores having a pore size of at least 0.5 μm. Examples of such an asymmetric membrane include a flat membrane having a two-layer cross-sectional structure substantially constituted of a surface skin layer and, communicating with the skin layer, a porous layer having finger-like pores or a porous layer of a spongy structure having no finger-like pores; and a hollow fiber membrane having a three-layer cross-sectional structure substantially constituted of the above-described two-layer structure and a porous surface layer having fine pores (pore size: about 1 to 2 μm) as the other surface layer.

The asymmetric membrane having such a structure can be easily produced, for example, by dissolving the aforementioned copolymer in an aprotic polar solvent such as N,N-dimethylformamide, N,N-dimethyl-acetamide or N-methyl-2-pyrrolidone to prepare a solution having a copolymer concentration of 10 to 30 wt. %, adding a third component such as water, polyethylene glycol or polyvinylpyrrolidone to the obtained solution if necessary, casting the resulting solution on a suitable support or extruding the resulting solution through a tube-in-orifice type nozzle, coagulating the cast or extruded solution in a coagulating bath according to a wet or dry-and-wet process to form an asymmetric membrane, and subjecting the membrane to a wet post-treatment in water at a temperature of at least 90° C. or in an atmosphere of steam or to a dry post-treatment in a dry atmosphere at a temperature of the glass transition point (Tg) of the copolymer to 180° C. to adjust the rate $Q(N_2)$ of nitrogen gas permeation through the obtained membrane in the range of $5 \times 10^{-6}$ cm³(STP)/cm²·sec·cmHg to $1 \times 10^{-3}$ cm³(STP)/cm²·sec·cmHg.

When the concentration of the aforementioned copolymer in an aprotic polar solvent solution is lower than 10 wt. %, the viscosity of the solution is too low, leading to a difficulty in forming a membrane. When it exceeds 30 wt %, the viscosity of the solution is too high to secure a membrane having the desired performance.

In effecting the wet post-treatment, it will suffice merely when a membrane is left to stand in heated water at a temperature of at least 90° C. or a water vapor for a predetermined period of time. When the membrane is further heated using water at at least 100° C., the membrane may be digested with steam under pressure. Such a heat treatment may be carried out before the membrane is assembled into various modules. However, a heat treatment wherein steam or hot water at a temperature of at least 90° C. is fed for a predetermined period of time may be conducted after a flat membrane is assembled into a tubular module, a plate-and-frame module, a spiral module or the like, or a hollow fiber membrane is assembled into a customary module. When the heat treatment temperature is lower than 90° C., disadvantageously pinholes existing in the skin layer of the surface portion of the membrane cannot be stopped by swelling and softening the membrane material, thus failing in improving the separation performance of the membrane.

The dry post-treatment is carried out in a dry atmosphere at a temperature of the glass transition point (Tg) of the copolymer to 180° C. The dry atmosphere means a state of reduced pressure or the presence of a gas such as air or nitrogen having a relative humidity of at most 90%, or a state of reduced pressure. The heat treatment temperature of the membrane can be varied in the range of the glass transition point (Tg) of the copolymer to 180° C. according to the kind of copolymer. In general, however, it is preferable to use as low a temperature as possible in the above-mentioned range lest the rate of permeation through the resulting membrane should be lowered. When the heat treatment temperature is lower than the glass transition point, a disadvantage is that pinholes existing in the skin layer of the surface portion of the membrane cannot be stopped by swelling and softening the membrane material, thus failing in improving the separation performance of the membrane. When it exceeds 180° C. the rate of nitrogen permeation through the resulting membrane increases to lower the separation factor disadvantageously. These post-treatments can be carried out in a state of the membrane being as such or after the membrane is assembled into one of various modules such as plate-and-frame, tubular and hollow fiber modules while passing a predetermined dry gas such as air or nitrogen or while in vacuo.

The post-treated asymmetric membrane preferably exhibits a rate $Q(N_2)$ of nitrogen permeation falling in the range of $5\times10^{-6}$ cm$^3$(STP)/cm$^2$·sec·cmHg to $1\times10^{-3}$ cm$^3$(STP)/cm$^2$·sec·cmHg. When the rate of nitrogen permeation is above the above-mentioned range, any desired high selective separation performance of the membrane is not secured. On the contrary, when it is below the above-mentioned range, high rate of permeation is not secured in mutual separation of organic substances or in separation of a water/organic substance mixture with the membrane.

The module type of the permselective membrane of the present invention may be selected from among a hollow fiber membrane type, a plate-and-frame type, a pleat type, a spiral type formed in a gyrated form, etc.

The permselective membrane of the polyacrylonitrile copolymer of the present invention thus obtained can be applied to mutual separations of a wide variety of mixtures of organic substances or to separations of a wide variety of water/organic substance mixtures by a separation method such as pervaporation, vapor permeation or perstraction. The water/organic substance mixtures include aqueous solutions containing at least one compound selected from the group consisting of organic acids such as formic acid, acetic acid, propionic acid and butyric acid; esters such as ethyl acetate; alcohols such as methanol, ethanol, 1-propanol, 2-propanol, n-butanol, and 2-methoxyethanol; ketones such as acetone and methyl ethyl ketone; ethers such as tetrahydrofuran and dioxane; aldehydes such as acetaldehyde and propionaldehyde and amines such as pyridine and picoline, and aqueous vapor mixtures containing water and at least one compound described above, and they are subjected to separation. Further, it is possible to conduct the separation of organic substances from the mixture thereof based on a difference therebetween in polarity or molecular size, for example, the separation of methanol from dimethyl carbonate, methyl acetate or the like capable of forming an azeotrope therewith. Furthermore, it is possible to simultaneously remove methanol and water from an organic substance/methanol/water mixture.

The polyacrylonitrile copolymer membrane of the present invention exhibits excellent performances as to both the separation factor and the rate of permeation therethrough in mutual separation of organic substances or in separation of a water/organic substance mixture, and is excellent in solvent resistance. Therefore, it is very useful in putting a separation process with a membrane to practical use.

According to the present invention, commercially available apparatuses for producing a reverse osmosis membrane, an ultrafiltration membrane and a fine filtration membrane can be used as such, and a separatory membrane which exhibits an excellent separation performance in mutual separation of organic substances or in separation of a water/organic substance mixture can be obtained without using a thin layer coating method which requires a high level of technology. Particularly, the asymmetric membrane obtained according to the present invention is especially suitable for a system wherein a high separation performance is required, with the result that a recovery loss can be minimized.

Further, the asymmetric membrane of the present invention can be treated in a large quantity at once with a customary apparatus to be very advantageous in an aspect of production cost.

The polyacrylonitrile copolymer membrane of the present invention exhibits such an excellent selective water permeability in pervaporation as to be usable for dehydration of various organic substance/water mixture solutions, and, in addition, can be used in various ways such as pervaporation, dialysis, reverse osmosis, and dehumidification of air by making the most of the properties thereof.

EXAMPLES

Figure 1:
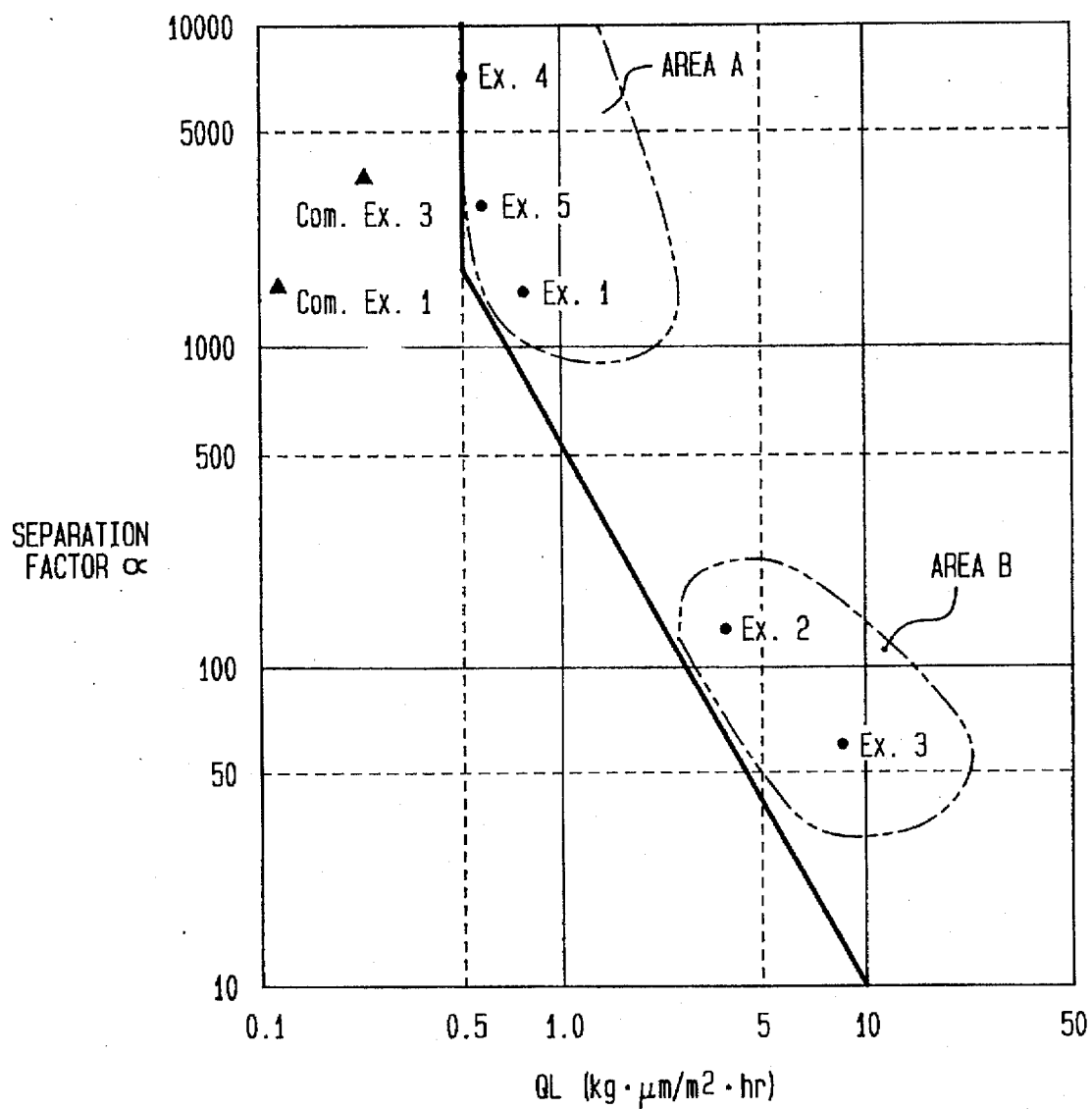
FIG. 1 is an illustrative view of a graph useful to evaluate the performance of the membrane of the present invention.

The following Examples will now more specifically illustrate the present invention but should not be construed as limiting the scope of the invention.

Examples 1 to 3 and Comparative Examples 1 and 2

40 to 50 g of acrylonitrile monomer (AN) and N-vinyl-2-pyrrolidone monomer (NVP) were dissolved in 500 ml of toluene at a molar ratio as specified in Table 1. 0.5 wt. %, based on the total monomers, of azobisisobutyronitrile was added as a polymerization initiator to the resulting solution, followed by polymerization at 60° C. for 5 to 8 hours. The polymer prepared by polymerization was washed with methanol.

Production of a membrane was conducted by dissolving 10 to 15 parts by weight of the polymer thus obtained in 85 to 90 parts by weight of dimethylformamide and casting the resulting solution on a glass plate, followed by drying at 80° C. for 2 hours and peeling off from the glass plate to be a dense uniform membrane.

The dehydration performances of these membranes were evaluated by pervaporation wherein use was made of an 80 wt. % aqueous solution of acetic acid at a temperature of 70° C. The results are shown in Table 1.

The membrane of Comparative Example 2 wherein 11 mol % N-vinyl-2-pyrrolidone was used in copolymerization was dissolved in the 80 wt. % aqueous solution of acetic acid at a temperature of 70° C., with the result that the performance of the membrane could not be evaluated.

TABLE 1

| No. | Composition of copolymer AN/NVP | α | QL | L |
| --- | --- | --- | --- | --- |
| Ex. 1 | 97/3 | 1747 | 0.77 | 19 |
| Ex. 2 | 93/7 | 148 | 3.67 | 18 |
| Ex. 3 | 91/9 | 61 | 9.22 | 22 |
| Comp. Ex. 1 | 100/0 | 1859 | 0.12 | 19 |
| Comp. Ex. 2 | 89/11 | incapable of being evaluated | | 21 |

(Note)
Composition of copolymer: molar ratio (%)
α: separation factor
QL: rate of permeation × thickness of membrane (kg · μm/m$^2$ · hr)
L: thickness of membrane (μm)

Examples 4 and 5 and Comparative Example 3

Acrylonitrile monomer (AN) was copolymerized with each of the comonomers listed in Table 2 at a molar ratio specified therein in the same manner as that of Example 1. Production of a membrane was conducted in the same manner as that of Example 1.

The pervaporation performances of these uniform membranes were evaluated using as a liquid feed an 80 wt. % aqueous solution of acetic acid at a temperature of 70° C. The results are shown in Table 3.

TABLE 2

| No. | Composition of copolymer (molar ratio %) |
| --- | --- |
| Ex. 4 | AN/methyl methacrylate = 95/5 |
| Ex. 5 | AN/vinyl acetate = 92/8 |
| Comp. Ex. 3 | AN/acrylic acid = 98/2 |

TABLE 3

| No. | α | QL | L |
|---|---|---|---|
| Ex. 4 | 6974 | 0.51 | 20 |
| Ex. 5 | 3529 | 0.55 | 17 |
| Comp. Ex. 3 | 3878 | 0.24 | 20 |

(Note)
α: separation factor
QL: rate of permeation × thickness of membrane (kg · μm/m² · hr)
L: thickness of membrane (μm)

Example 6

A flat asymmetric polyacrylonitrile ultrafiltration membrane DUY-HH (a product of Daicel Chemical Industries, Ltd.; molar amount of contained acrylonitrile about 90%) was boiled up in water at 96° C. for 30 minutes and dried with air. The rate $Q(N_2)$ of nitrogen gas permeation through the membrane had been $1.3 \times 10^{-2}$ cm³(STP)/cm²·sec·cmHg before the heat treatment, but was $1.0 \times 10^{-5}$ cm³(STEP)/cm²·sec·cmHg after the heat treatment. The dehydration performance of the membrane from an 80 wt. % aqueous solution of acetic acid at a temperature of 70° C. was evaluated by pervaporation. The separation factor α was 39, while the permeation rate Q was 0.8 kg/m²·hr.

Comparative Example 4

A flat membrane DUY-HH was dried with air without being boiled up. The dehydration performance of the resulting membrane from an 80 wt. % aqueous solution of acetic acid at a temperature of 70° C. was evaluated by pervaporation as in Example 1. The separation factor α was 1, while the permeation rate Q was 3.5 kg/m²·hr.

Example 7

An acrylonitrile/vinylpyrrolidone copolymer (molar ratio=93/7) was dissolved in N,N-dimethylformamide (DMF) to prepare a 20 wt. % solution of the copolymer, which was then applied on a polyester fabric at a coating thickness of 250 μm, and then coagulated in water at 15° C. to form an asymmetric membrane having a 1 μm-thick skin layer. Further, the resulting membrane was boiled up in water at 96° C. for 30 minutes and dried with air. The rate $Q(N_2)$ of nitrogen gas permeation through the membrane had been $1.3 \times 10^{-2}$ cm³(STP)/cm²·sec·cmHg before the heat treatment, but was $3.8 \times 10^{-5}$ cm³(STP)/cm²·sec·cmHg after the heat treatment. The separation performance of the membrane with respect to the water/acetic acid mixture solution was evaluated by pervaporation in the same manner as that of Example 6. The separation factor α was 46, while the permeation rate Q was 2.8 kg/m²·hr.

Comparative Example 5

The same asymmetric membrane as in Example 7 was formed using the same copolymer as in Example 7. Pieces of the membrane were boiled up in water at 80° C. respectively for 30 minutes and for 2 hours, followed by air-drying separately. The separation performances of the resulting membranes with respect to the water/acetic acid mixture solution were evaluated by pervaporation in the same manner as that of Example 6. In the case of the membrane heated for 30 minutes, the separation factor α was 3, while the permeation rate Q was 8.6 kg/m²·hr. In the case of the membrane heated for 2 hours, the separation factor α was 3, while the permeation rate Q was 4.1 kg/m²·hr.

Example 8

An acrylonitrile/vinyl acetate copolymer (molar ratio=92/8) was formed into a symmetric membrane in the same manner as that of Example 7, followed by boiling up in boiling water at 100° C. for 2 hours. The rate $Q(N_2)$ of nitrogen gas permeation through the membrane had been $1.3 \times 10^{-2}$ cm³(STP)cm²·sec·cmHg before the heat treatment, but was $3.5 \times 10^{-5}$ cm³(STP)/cm²·sec·cmHg after the heat treatment. The separation performance of the membrane with respect to the water/acetic acid mixture solution was evaluated by pervaporation as in Example 6. The separation factor α was 54, while the permeation rate Q was 1.1 kg/m²·hr.

Example 9

The same asymmetric membrane as in Example 7 was formed and then boiled up in water heated at 100° C. for 60 minutes, followed by air-drying. The rate $Q(N_2)$ of nitrogen gas permeation through the membrane had been $1.3 \times 10^{-2}$ cm³(STP)/cm²·sec·cmHg before the heat treatment, but was $3.8 \times 10^{-5}$ cm³(STP)/cm²·sec·cmHg after the heat treatment. The separation performance of the resulting membrane with respect to the liquid mixture of dimethyl carbonate/methanol=45/55 (by weight; liquid temperature: 60° C.) was evaluated by pervaporation. As a result, methanol in the liquid mixture was separeted with the separation factor α being 180 and the permeation rate Q being 0.9 kg/m²·hr.

Example 10

The same copolymer as in Example 7 was dissolved in DMF to prepare a solution having a copolymer concentration of 20 wt. %. The solution heated at 50° C. was extruded from a hollow fiber spinneret heated at 60° C. at a spinning rate of 1.0 to 1.3 m/min, while simultaneously flowing, as a core liquid, a liquid mixture of water and dimethyl sulfoxide (weight ratio: 1:1) at 60° C. The hollow fiber was coagulated in a coagulating bath disposed at a distance of 40 cm under the spinneret with warm water at 60° C. The spun hollow fiber was further washed with warm water at 60° C. for 6 hours, and then washed with flowing water at an ordinary temperature for 24 hours. The washed hollow fiber in a wet state was heated as such in hot water at 100° C. for 60 minutes, followed by air-drying for 24 hours.

The pervaporation performance of the resulting hollow fiber was evaluated with a high-precision, high-speed, measuring apparatus for membrane-permeated vapor, manufactured by Yanagimoto Seisakusho, with the 80 wt. % aqueous solution of acetic acid as in Example 6. The separation factor α was 45, while the permeation rate Q was 1.1 kg/m²·hr.

Example 11

A polyacrylonitrile copolymer (acrylonitrile/vinyl acetate/2-N,N-diethylaminoethyl methacrylate=94/5/1 by mol %) polymerized by a known method was dissolved in DMF to prepare a solution having a copolymer concentration of 10 wt. %. The solution was applied on a glass plate and dried at 80° C. for 2 hours to form a film, which was then further dried under reduced pressure at 100° C. for 24 hours to completely remove the solvent therefrom. Thus, a uniform membrane having a thickness of 20 μm was formed.

The dehydration performance of this membrane from an 80 wt. % aqueous solution of acetic acid at a temperature of 70° C. was evaluated by pervaporation. The separation factor α was 300, while the permeation rate Q was 2 kg/m²·hr. The glass transition point of this membrane was measured using DSC to be 93° C.

Example 12

The same copolymer as in Example 11 was dissolved in DMF to prepare a 20 wt. % solution of the copolymer, which was then applied on a polyester fabric at a coating thickness of 250 μm, followed by coagulation thereof in water at 15° C. to produce an asymmetric membrane having a 1 μm-thick skin layer. Further, the resulting membrane was boiled up in water at 100° C. for 60 minutes, followed by air-drying. The water/acetic acid separation performance of the resulting membrane was evaluated by pervaporation in the same manner as that of Example 11. The separation factor α was 60, while the permeation rate Q was 3.5 kg/m²·hr.

Comparative Example 6

The same asymmetric membrane as in Example 12 was produced using the same copolymer as in Example 12. Pieces of the membrane were boiled up in water at 80° C. respectively for 30 minutes and for 2 hours, followed by air-drying separately. The water/acetic acid separation performances of the resulting membranes were evaluated by pervaporation in the same manner as that of Example 11. In the case of the membrane heated for 30 minutes, the separation factor α was 3. while the permeation rate Q was 8.6 kg/m²·hr. In the case of the membrane heated for 2 hours, the separation factor α was 3, while the permeation rate Q was 4.1 kg/m²·hr.

Example 13

The same asymmetric membrane as in Example 12 was produced, followed by boiling up in boiling water at 100° C. for 1 hour. The water/acetic acid/ethyl acetate separation performance of the resulting membrane was evaluated by pervaporation in the same manner as that of Example 11. The organic substance (acetic acid and ethyl acetate) separation factor α was 900, while the permeation rate Q was 4.8 kg/m²·hr.

Example 14

The same asymmetric membrane as in Example 12 was produced, followed by boiling up in hot water at 100° C. for 60 minutes and subsequent air-drying. The separation performance of the resulting membrane with respect to dimethyl carbonate/methanol=45/55 (weight ratio; liquid temperature: 60° C.) was evaluated by pervaporation in the same manner as that of Example 11. As a result, methanol in the liquid mixture was separated with the separation factor α was 180 and the permeation rate Q was 0.8 kg/m²·hr.

Example 15

The copolymer described in Example 11 was dissolved in DMF to prepare a solution having a copolymer concentration of 20 wt. %. The solution heated at 50° C. was extruded from a hollow fiber Spinneret heated at 60° C. at a spinning rate of 1.0 to 1.3 m/min, while simultaneously flowing, as a core liquid, a liquid mixture of water/dimethyl sulfoxide (1:1 weight ratio). The hollow fiber was coagulated in a coagulating bath disposed at a distance of 40 cm under the spinneret with warm water at 60° C. The spun hollow fiber was further washed with warm water at 60° C. for 6 hours, and then washed with flooring water at an ordinary temperature for 24 hours. The washed hollow fiber in a wet state was heated as such in hot water at 100° C. for 80 minutes, followed by air-drying for 24 hours.

The pervaporation performance of the resulting hollow fiber was evaluated with a high-precision high-speed, measuring apparatus for membrane-permeated vapor, manufactured by Yanagimoto Seisakusho, with respect to the 80 wt. % aqueous solution of acetic acid as in Example 11. The separation factor a was 45, while the permeation rate Q was 1.1 kg/m²·hr.

Example 16

The copolymer described in Example 11 was dissolved in DMF to prepare a 20 wt. % solution of the copolymer, which was then applied on a polyester fabric at a coating thickness of 250 μm, followed by coagulation thereof in water at 15° C. to produce an asymmetric membrane having a 1 μm-thick skin layer.

This membrane was dried with air, then dried in vacuo at 100° C. for 12 hours, and further dried in vacuo at 120° C. for 6 hours to obtain a dry asymmetric membrane which exhibited a rate Q(N₂) of nitrogen permeation therethrough of 1×10⁻⁴ cm³(STP)/cm²·sec·cmHg. The water/acetic acid separation performance of the resulting membrane was evaluated by pervaporation in the same manner as that of Example 11. The separation factor α was 69, while the permeation rate Q was 1.1 kg/m²·hr.

Examples 17 and 18

The pervaporation performance of the same membrane as that of Example 16 was evaluated in the same manner as that of Example 16 except that the temperature at which the separation performance was evaluated was 80° C. and 90° C. Results shown in Table 4 were obtined.

TABLE 4

| Ex. No. | Separation factor α | Rate of permeation Q | Evaluation temp. |
|---|---|---|---|
| 17 | 71 | 1.56 kg/m² · hr | 80° C. |
| 18 | 50 | 2.42 kg/m² · hr | 90° C. |

Examples 19 to 27

The pervaporation performances of the membranes were evaluated in the same manner as that of Example except that the final heat treatment temperature was varied in the range of 120° to 180° C. The results are shown in Table 5.

TABLE 5

| Ex. no. | Heat treatment temp. (°C.) | Rate of nitrogen permeation Q(N₂)*¹ | Temp. for evaln. of pervaporation (°C.) | Separation factor α | Rate of permeation Q*² |
|---|---|---|---|---|---|
| 19 | 140 | 2.2 × 10⁻⁴ | 70 | 220 | 0.8 |
| 20 | 140 | 2.2 × 10⁻⁴ | 80 | 140 | 1.4 |
| 21 | 140 | 2.2 × 10⁻⁴ | 90 | 82 | 2.3 |
| 22 | 160 | 2.3 × 10⁻⁴ | 70 | 216 | 0.7 |
| 23 | 160 | 2.3 × 10⁻⁴ | 80 | 170 | 1.2 |
| 24 | 160 | 2.3 × 10⁻⁴ | 90 | 90 | 2.0 |
| 25 | 180 | 8.0 × 10⁻⁴ | 70 | 121 | 0.6 |
| 26 | 180 | 8.0 × 10⁻⁴ | 80 | 82 | 1.0 |
| 27 | 180 | 8.0 × 10⁻⁴ | 90 | 56 | 1.5 |

(Note)
*¹unit cm³(STP)/cm² · sec · cmHg
*²unit kg/m² · hr

Comparative Examples 7 to 12

The pervaporation performances of the asymmetric membranes, which were produced in the same manner as that of Example 16 except that the final heat treatment temperature was elevated to 200° C. and 220° C., were evaluated in the same manner as that of Example 16. The results are shown in Table 6.

As is apparent from Table 6, the rate of nitrogen permeation was increased, while the separation factor was correspondingly decreased.

TABLE 6

| Comp. Ex. no. | Heat treatment temp. (°C.) | Rate of nitrogen permeation Q(N₂)*¹ | Temp. for evaln. of pervaporation (°C.) | Separation factor α | Rate of permeation Q*² |
|---|---|---|---|---|---|
| 7 | 200 | 1.2 × 10⁻³ | 70 | 45 | 0.4 |
| 8 | 200 | 1.2 × 10⁻³ | 80 | 34 | 0.7 |
| 9 | 200 | 1.2 × 10⁻³ | 90 | 25 | 1.0 |
| 10 | 220 | 3.1 × 10⁻³ | 70 | 3.9 | 5.0 |
| 11 | 220 | 3.1 × 10⁻³ | 80 | 4.3 | 6.0 |
| 12 | 220 | 3.1 × 10⁻³ | 90 | 4.1 | 7.2 |

(Note)
*¹unit cm³(STP)/cm² · sec · cmHg
*²unit kg/m² · hr

Example 28

A flat asymmetric polyacrylonitrile ultrafiltration membrane DUY-HH (a product of Daicel Chemical Industries, Ltd.; molar amount of contained acrylonitrile about 90%) was dried in an oven at 160° C. for 3 hours. The rate Q(N₂) of nitrogen gas permeation through the membrane had been $1.3\times10^{-2}$ cm$^3$(STP)/cm$^2$·sec·cmHg before the heat drying treatment, but was $5.0\times10^{-5}$ cm$^3$(STP)/cm$^2$·sec·cmHg after the heat treatment. The separation performance of the resulting membrane was measured by pervaporation with respect to the water/acetic acid liquid mixture (the liquid used for evaluation 80 wt. % acetic acid; 70° C.) and the water selectivity was evaluated. The separation factor was 340, while the permeation rate Q was 0.5 kg/m$^2$·hr.

Example 29

The copolymer described in Example 11 was dissolved in DMF to prepare a solution having a copolymer concentration of 20 wt. %. The solution heated at 50° C. was extruded from a hollow fiber spinneret heated at 60° C. at a spinning rate of 1.0 to 1.3 m/min, while simultaneously flowing, as a core liquid, a liquid mixture of water and dimethyl sulfoxide (1:1 weight ratio) heated at 60° C. The hollow fiber was coagulated in a coagulating bath disposed at a distance of 40 cm under the spinneret with warm water at 60° C. The spun hollow fiber was further washed with warm water at 80° C. for 6 hours, and then washed with flowing water having an ordinary temperature for 24 hours.

The washed hollow fiber was dried with air and then assembled into a 0.1 m$^2$ module. Dry air at a temperature of 140° C. was passed through the inside of the hollow fiber to effect heat treatment.

The pervaporation performance of this hollow fiber module was evaluated using a 90 wt. % aqueous solution of isopropyl alcohol at a temperature of 70° C. The separation factor $\alpha$ was 2,400, while the permeation rate Q was 0.5 kg/m$^2$·hr.

I claim:

1. A permselective membrane of a polyacrylonitrile copolymer for separation of an organic substance from a mixture with water or another organic substance, comprising:

at least one polyacrylonitrile copolymer having about 90 to 97 mol % of acrylonitrile monomer units;

and at least one comonomer unit selected from the group consisting of comonomers represented by the general formula:

$R^1(R^2)C=C(R^3)R^4$ wherein $R^1$, $R^2$, $R^3$, and $R^4$ each represent a substituent selected from the group consisting of a hydrogen atom, alkyl, hydroxyl, carboxyl, acid anhydride, amide, imide, sulfonic, phosphoric, amino, pyridyl, and glycidyl groups, and derivatives thereof, except wherein:
   all substituents are hydrogen atoms, or
   one substituent is a methyl group and three substituents are hydrogen atoms, wherein the membrane is characterized by having: a rate, Q (kg/m$^2$ hr) of selective permeation of water times the membrane thickness, L (μm), of at least 0.5 kg·μm/m$^2$·hr, a separation factor of $\alpha \geq 10$, and $\log\alpha \geq -1.77\times\log(QL) +2.77$, when the pervaporation performance of a 5–30 μm-thick membrane is evaluated using, as a liquid feed, an 80 wt. % aqueous solution of acetic acid at a temperature of 70° C.

2. The permselective membrane according to claim 1, wherein the membrane is asymmetric having a dense skin layer on one side with a thickness of about 0.05 to 5 μm and substantially free from pores having a pore size greater than about 0.5 μm.

3. The permselective membrane according to claim 2, wherein the membrane is flat and has a two-layer cross-sectional structure consisting of a surface skin layer and a porous layer.

4. The permselective membrane according to claim 3, wherein the porous layer comprises:

finger-like pores in communication with the surface skin layer.

5. The permselective membrane according to claim 3, wherein the porous layer comprises:

a spongy structure without finger-like pores.

6. The permselective membrane according to claim 2, wherein the membrane comprises:

a hollow fiber membrane having a three-layer cross-sectional structure consisting of a surface layer with a surface skin layer on one side, a porous layer in communication with said surface skin layer, and a porous surface layer having fine pores on another side.

7. The permselective membrane according to claim 6, wherein the porous layer comprises:

finger-like pores in communication with the surface skin layer.

8. The permselective membrane as in one of claims 2–6, wherein the rate Q(N$_2$) of nitrogen gas permeation through said membrane is in the range of $5\times10^{-6}$ to $1\times10^{-3}$ cm$^3$(STP)/cm$^2$·sec·cmHg.

9. The permselective membrane as in one of claims 1–6, wherein at least one comonomer is a water-soluble monomer.

10. The permselective membrane as in one of claims 1–6, wherein at least one comonomer is selected from the group consisting of N-vinyl-2-pyrrolidone, vinyl acetate, methyl acrylate, acrylic acid and acrylamide.

11. The permselective membrane as in one of claims 1–6, wherein the copolymer is one having, as the comonomer units, vinyl acetate monomer units and 2-N,N-diethylaminoethyl methacrylate monomer units in the ranges of 1 to 9.5 mol % and 0.5 to 9 mol %, respectively.

12. The permselective membrane as in one of claims 1–6, wherein the membrane is selected from the group consisting of pervaporation, vapor permeation and perstraction membranes.

13. A permselective membrane of a polyacrylonitrile copolymer for separation of an organic substance from a mixture with water or another organic substance, comprising:

at least one polyacrylonitrile copolymer having about 90 to 97 mol % of acrylonitrile monomer units, and at least one comonomer unit of N-vinyl-2-pyrrolidone, wherein the membrane is characterized by having:

a rate, Q (kg/m$^2$ hr) of selective permeation of water times the membrane thickness, L (μm), of at least 0.5 kg·μm/m$^2$·hr, a separation factor of $\alpha \geq 10$, and $\log\alpha \geq -1.77\times\log(QL) +2.77$, when the pervaporation performance of a 5–30 μm-thick membrane is evaluated using, as a liquid feed, an 80 wt. % aqueous solution of acetic acid at a temperature of 70° C.

* * * * *